June 10, 1947.  R. C. SANDERS, JR  2,422,133
FREQUENCY MODULATED ALTIMETER OR DISTANCE INDICATOR
Filed Dec. 30, 1942  2 Sheets-Sheet 1
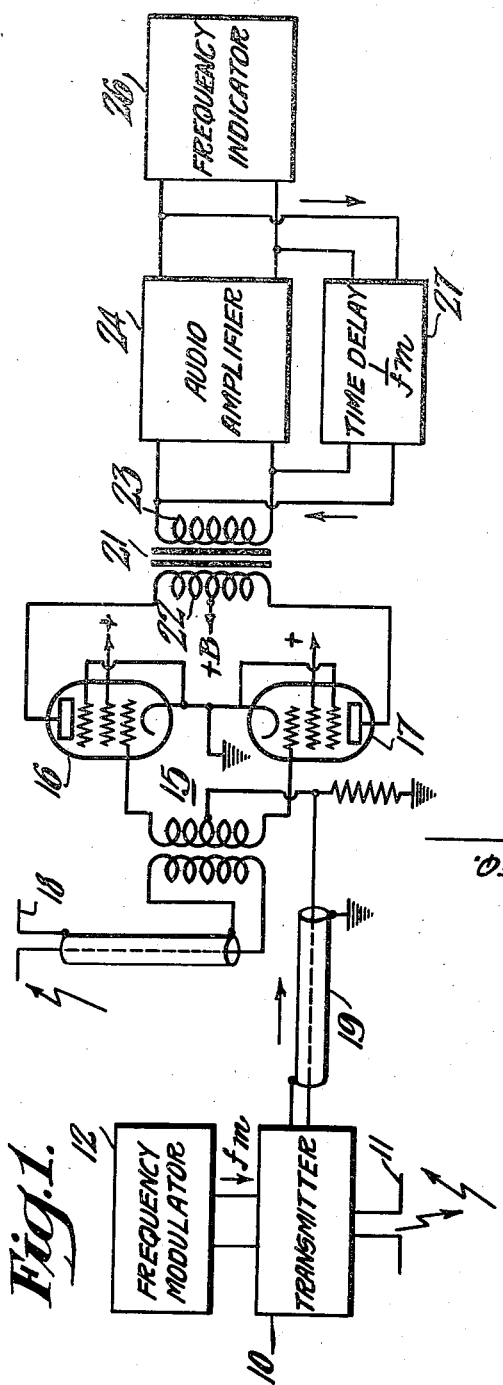
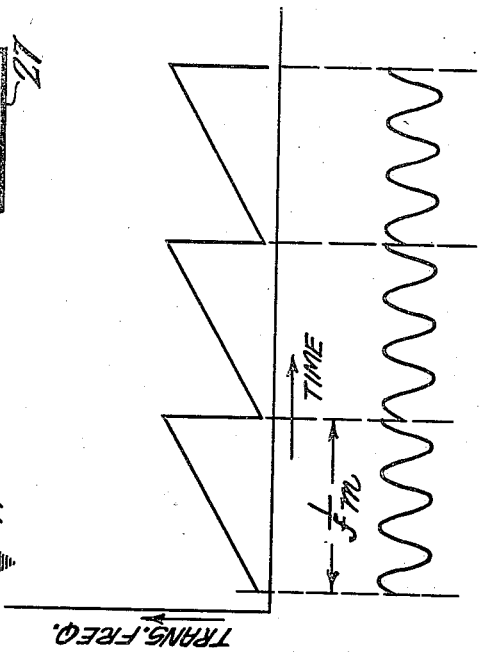
Inventor
Royden C. Sanders, Jr.
By
Attorney

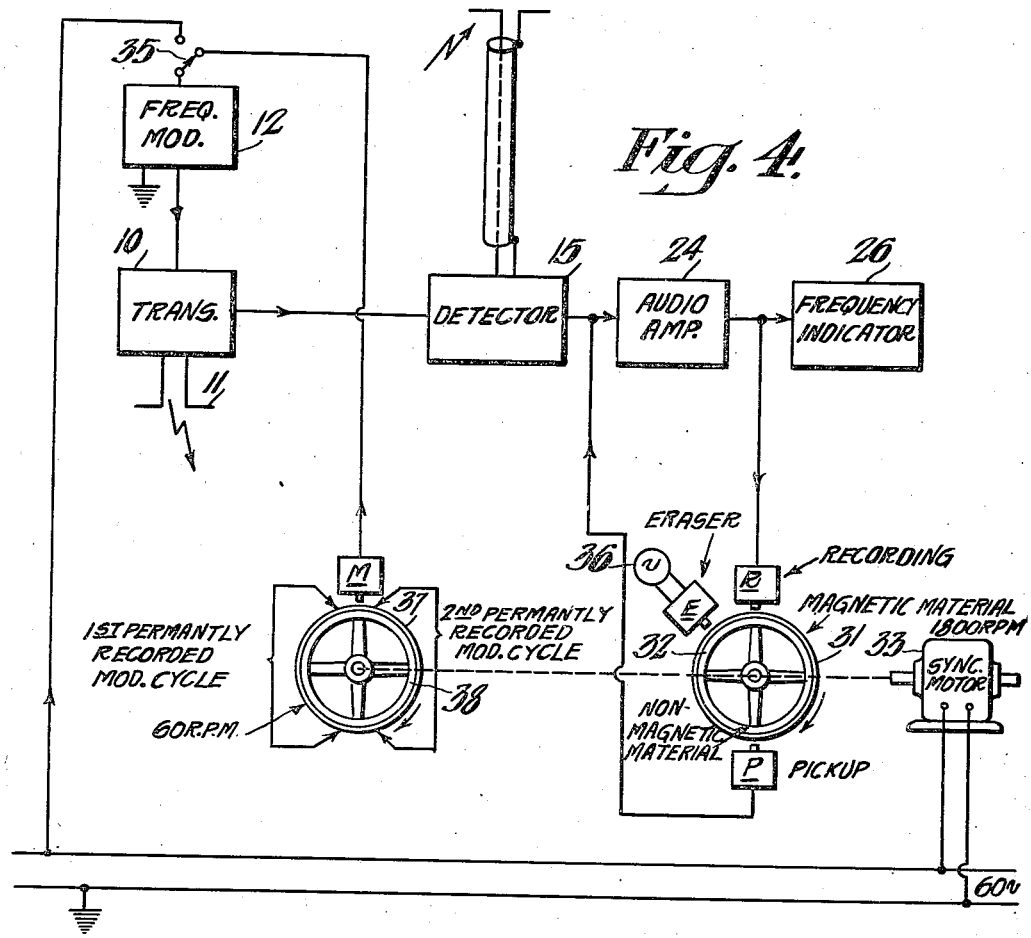

Patented June 10, 1947

2,422,133

UNITED STATES PATENT OFFICE 2,422,133

FREQUENCY MODULATED ALTIMETER OR DISTANCE INDICATOR

Royden C. Sanders, Jr., Hightstown, N. J., assignor to Radio Corporation of America, a corporation of Delaware Application December 30, 1942, Serial No. 470,695

6 Claims. (Cl. 250—1.68)

My invention relates to radio systems such as radio altimeters or other distance indicating apparatus of the type utilizing reflected waves. It will be described particularly with respect to systems wherein the transmitted wave is cyclically frequency modulated.

Systems of this character are described in Bentley Patent 2,011,392 and Espenschied Patent 2,045,071. In these systems, the radiated frequency-modulated wave is reflected from the earth's surface or other object and the reflected wave is received in a heterodyne receiver located in the vicinity of the transmitter. The heterodyning or mixing signal for the receiver is obtained directly from the transmitter whereby the received output includes a signal of "beat frequency" which frequency is a function of the time required for the radiated signal to reach the reflecting object and return to the receiver.

An object of the invention is to provide an improved distance measuring system of the type utilizing reflected waves.

A further object of the invention is to provide an improved method of and means for increasing the signal-to-noise ratio of the "beat frequency" signal output of a receiver in a frequency-modulated distance determining system.

In a preferred embodiment of the invention, advantage is taken of the fact that the beat frequency wave pattern of the receiver output repeats at the modulating frequency $f_m$, that is, at the frequency at which the transmitted signal is cyclically swept through a certain frequency band. Because of this repetitive characteristic of the receiver output, it is possible to provide the audio or beat frequency amplifier of the receiver with a regenerative feedback circuit in which a delay network introduces the correct amount of time delay to cause the beat frequency signal that is produced during one frequency-modulation sweep to be reinforced by the beat frequency signal that was produced during the preceding frequency-modulation sweep. The amount of time delay required for this is the period of one frequency-modulation sweep or a time delay equal to this period multiplied by a whole number. Strictly speaking, the foregoing remarks apply only to the case where the distance from the distance measuring system to the reflecting object remains fixed. As a practical matter, however, if there is a change in this distance, it will not greatly affect the operation of the invention, providing the change is not too rapid, even though such a change causes the beat frequency signal to start at a slightly different part of the cycle at the beginning of each frequency-modulation sweep.

The invention will be better understood from the following description taken in connection with the accompanying drawing in which Figure 1 is a circuit diagram of a frequency-modulation distance indicator designed in accordance with one embodiment of the invention; Figure 2 is a graph illustrating the manner in which the transmitter is cyclically frequency modulated; Figure 3 is a graph illustrating the periodic or repetitive characteristic of the beat frequency signal supplied to the audio or beat frequency amplifier of Fig. 1; and Figure 4 is a block diagram of another embodiment of the invention. In the several figures similar parts are indicated by similar reference characters.

Referring to Fig. 1, the apparatus comprises a frequency modulated radio transmitter 10 having an antenna such as a dipole 11 which radiates a frequency modulated signal toward the target or other reflecting object. Such a signal is produced by sweeping the frequency of the carrier wave of the transmitter 10 through a frequency band at the periodic rate $f_m$ whereby a cyclically frequency-modulated carrier wave is obtained. This may be done by means of a suitable frequency modulator 12, which in one simple form may comprise a motor driven capacitor for varying the tuning of the transmitter oscillator as described in the above-mentioned Espenschied patent, or it may comprise a vibrating capacitor or a reactance tube circuit.

The specific receiver, which will be described for the purpose of illustration, includes a heterodyne detector 15 comprising two vacuum tubes 16 and 17 connected in balanced relation. The reflected signal is picked up by an antenna such as a dipole 18 and applied in push-pull relation to the input circuits of the tubes 16 and 17. The heterodyning signal is applied in parallel relation from the transmitter 10 over a line 19 to the input circuits of the tubes 16 and 17, this signal being the same as that radiated from antenna 11. The output circuit of the balanced detector includes a transformer 21 that has a center-tapped primary 22 and a secondary 23. Anode voltage is supplied from a suitable "B" supply (not shown) through the center tap and through opposite halves of the primary 22 to the anodes of tubes 16 and 17. The secondary 23 supplies the beat frequency output signal to an audio frequency amplifier 24 and to a suitable frequency counter or indicator 26.

It may be noted that the balanced type of detector circuit described above is desirable for the purpose of balancing out any amplitude modulation that may be present. It is described and claimed in the application of Irving Wolff and Royden C. Sanders, Serial No. 445,010, filed May 29, 1942, and entitled Frequency modulated altimeter or distance indicator. Any amplitude modulation that may be present in the mixing signal or in the reflected signal or any jamming signal is balanced out in the primary 22. The beat frequency signal from tube 16 and the beat frequency signal from tube 17 will add in the primary 22 and will appear across secondary 23 where it is impressed upon the audio amplifier 24. It should be understood that the invention is not limited to the use of this balanced type of receiver as any suitable receiver may be employed.

In accordance with the present invention, a regenerative feedback circuit is provided through a suitable delay network or other delay means 27 which preferably has a time delay equal to $1/f_m$ where $f_m$ is the frequency-modulation frequency. Various types of delay networks which are suitable for use in my invention are known in the art. Also, instead of electrical networks there may be employed delay devices of the acoustic type or of the magnetic recording type, for example. It will be apparent that if the beat-frequency signal fed back through the time delay device 27 is impressed upon the input circuit of audio amplifier 24 in phase with the signal being received from the detector 16—17, there will be additive reinforcement of the desired beat frequency signal. There will be substantially less reinforcement of random noise signals since this reinforcement will be in accordance with the square root of the sum of the squares of such signals.

The operation of the invention may be seen more clearly by referring to Figs. 2 and 3. Fig. 2 illustrates the cyclic frequency modulation of the transmitter where the period of the frequency sweep is $1/f_m$. The beat-frequency signal that appears in the detector output circuit during each of these periodic frequency sweeps is shown in Fig. 3. It will be noted that, assuming no change in the distance between the transmitter and the reflecting object, the beat-frequency signal at the beginning of each periodic sweep starts at the same point in the cycle. Thus it is possible to delay the beat-frequency signal by the time $1/f_m$ so that, at the audio amplifier input circuit, the beat-frequency signal produced during one frequency-modulation sweep will occur in phase with and reinforce the beat-frequency signal produced during the next occurring frequency-modulation sweep.

By utilizing the present invention, a substantial increase in signal-to-noise ratio may be obtained. The amount of improvement in signal-to-noise ratio can be expressed by the equation $$\sqrt{\frac{1+K}{1-K}}$$

where K is the gain through the regenerative feedback circuit and has a value less than one, and where constant gain over the frequency band is assumed.

It should be understood that the cyclic frequency modulation need not be in accordance with a sawtooth wave form (shown in Fig. 2) but, if preferred, may be in accordance with other wave shapes such as a sine wave or a triangular wave, for example.

Figure 4 shows an embodiment of the invention in which the desired delay in the feed-back circuit is obtained by means of magnetic recording on a moving tape 31 of suitable magnetic material. The tape 31 may be carried by a wheel 32 of non-magnetic material which is driven by a motor 33.

The output signal of the audio amplifier 24 is recorded on the tape 31 by means of a magnetic recording element R. At the end of one-half a rotation of the tape 31 the same signal is taken off the tape by means of a pickup unit P and is supplied to the input circuit of amplifier 24. After the tape passes the pickup unit P, it is wiped off or erased by suitable means such as an erasing unit E supplied with alternating current from a source 36.

One way of making certain that the amount of delay in the feedback circuit always has the proper relation to the modulation cycle is to obtain the frequency modulating signal from a moving tape 37 on which the modulating signal is permanently recorded, and to rotate this tape synchronously with the time delay tape 31. In the example shown, the tape 37 is carried by a non-magnetic wheel 38 which is mechanically coupled to the same shaft that is driving the delay tape 31. One cycle of the modulating signal is permanently recorded on each half of the tape 37 whereby there are two modulating cycles for each rotation of the wheel 38. The recorded signal on each half of the tape 37 may be of any desired wave form such as a sawtooth or a sine wave. The recorded signal is taken off the tape by a pickup unit M which supplies the modulating signal to the modulator 12 through a switch 35.

It will be evident that when the time delay device and the frequency modulating signal source are coupled mechanically as described, there is always the correct time delay to make one beat-frequency cycle reinforce the next occurring beat-frequency cycle. In this specific embodiment of the invention, the motor 33 need not be of the synchronous type but in the embodiment described below it should be synchronous.

Instead of obtaining the frequency modulation by means of a permanent recording, the switch 35 may be moved to its other position to connect the frequency modulator 12 (a vibrating capacitor unit, for example) to the 60 cycle power line. Since the magnetic delay tape 31 is being driven by a synchronous motor, the delay period will always be synchronous with the frequency-modulation cycle.

I claim as my invention:

1. A distance measuring system comprising means for cyclically frequency modulating a wave at a periodic rate for $f_m$, means for transmitting said modulated wave to a reflecting object, a beat-frequency detector, means for supplying said wave to said detector after reflection from said object, means for supplying a portion of said wave directly from the transmitter to said detector whereby a cyclically recurring beat-frequency signal is obtained, an amplifier for said beat frequency signal, and a regenerative feedback circuit for said amplifier, said feedback circuit including means for introducing a delay substantially equal to $1/f_m$ times a whole number.

2. The method of distance measuring comprising cyclically frequency modulating a wave at a periodic rate of $f_m$, transmitting said modulated wave to a reflecting object, heterodyning said wave after reflection from said object with a portion of said wave supplied directly from the point of transmission whereby a cyclically recurring beat-frequency signal is obtained, amplifying said beat-frequency signal, delaying a portion of said amplified signal by an amount substantially equal to $1/f_m$ times a whole number, and utilizing said delayed signal to regeneratively reinforce said amplification.

3. A distance measuring system comprising a transmitter for producing a wave that is cyclically frequency modulated at a periodic rate of $f_m$ and for transmitting said modulated wave to a reflecting object, a beat-frequency detector, means for supplying said wave to said detector after reflection from said object, means for supplying a portion of said wave directly from the transmitter to said detector whereby a cyclically recurring beat-frequency signal is obtained, an amplifier for said beat frequency signal, a delay network which provides a delay substantially equal to $1/f_m$ times a whole number, and means for coupling the output circuit of said amplifier to the input circuit of said amplifier through said delay network to introduce regeneration.

4. A distance measuring system comprising means for cyclically frequency modulating a wave at a periodic rate of $f_m$, means for transmitting said modulated wave to a reflecting object, a beat-frequency detector, means for supplying said wave to said detector after reflection from said object, means for supplying a portion of said wave directly from the transmitting means to said detector whereby a cyclically recurring beat-frequency signal is obtained, an amplifier for said beat-frequency signal, a regenerative feedback circuit for said amplifier, said feedback circuit including an electro-mechanical delay means for introducing a delay substantially equal to $1/f_m$ times a whole number, and means for maintaining synchronism between said delay means and said cyclic frequency modulation.

5. A distance measuring system comprising means for producing a carrier wave, a modulating wave producing means which includes an element having thereon a record of a modulating wave and a pickup unit for reproducing said modulating wave, means for cyclically frequency modulating said carrier wave by said reproduced modulating wave at a periodic rate of $f_m$, means for transmitting said modulated wave to a reflecting object, a beat-frequency detector, means for supplying said modulated wave to said detector after reflection from said object, means for supplying a portion of said modulated wave directly from the transmitting means to said detector whereby a cyclically recurring beat-frequency signal is obtained, an amplifier for said beat-frequency signal, a regenerative feedback circuit for said amplifier, said feedback circuit including an electro-mechanical delay means for introducing a delay substantially equal to $1/f_m$ times a whole number, and synchronizing means coupling said delay means and said modulating wave producing device.

6. The invention according to claim 5 wherein said modulating wave producing means and said delay means each include a movable element and wherein said movable elements are mechanically connected.

ROYDEN C. SANDERS, JR.

REFERENCES CITED

The following references are of record in the file of this patent:

UNITED STATES PATENTS

| Number | Name | Date |
| --- | --- | --- |
| 2,206,903 | Lane et al. | July 9, 1940 |
| 2,280,109 | Varela | Apr. 21, 1942 |
| 2,212,420 | Harnett | Aug. 20, 1940 |